(No Model.) 2 Sheets—Sheet 1.
G. ROBSON.
SEPARATION OF METALS AND METALLIC COMPOUNDS FROM ORES OR OTHER SUBSTANCES.
No. 575,669. Patented Jan. 19, 1897.
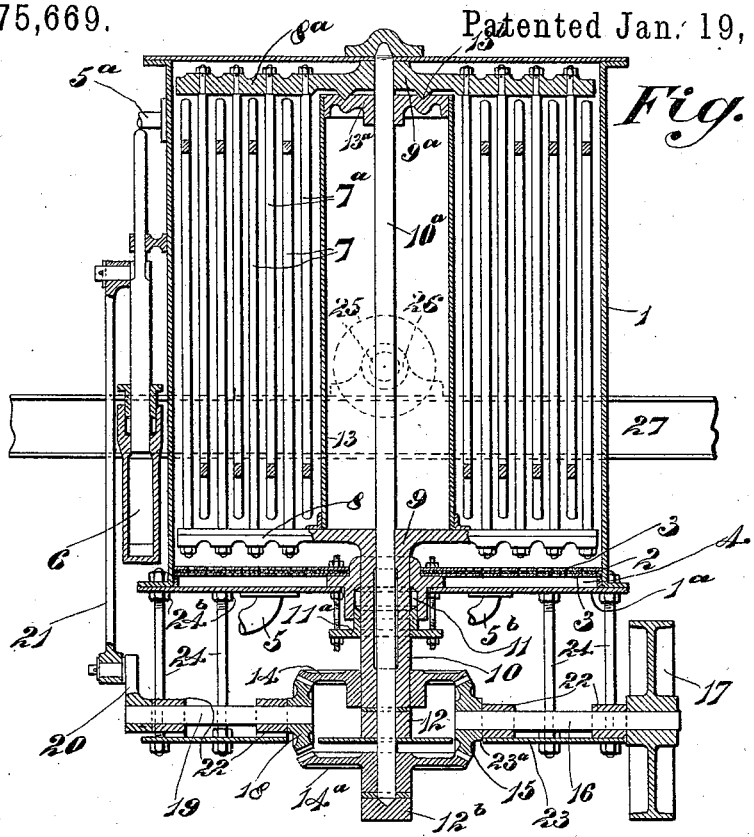
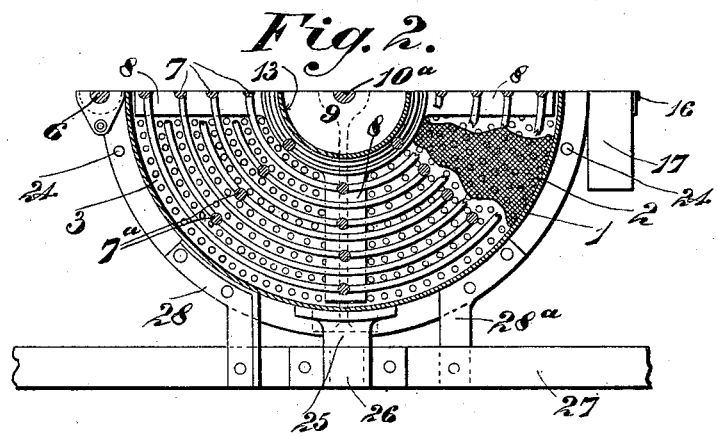
Witnesses.
E. E. Duff
Hubert Peck
Inventor:
George Robson
per O. E. Duff
Attorney

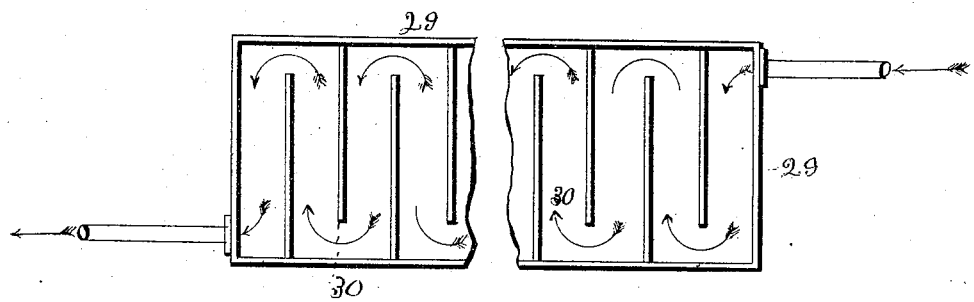

UNITED STATES PATENT OFFICE.

GEORGE ROBSON, OF DOLGELLY, ENGLAND, ASSIGNOR TO HIMSELF, AND SAMUEL CROWDER, OF LONDON, ENGLAND.

SEPARATION OF METALS AND METALLIC COMPOUNDS FROM ORES OR OTHER SUBSTANCES.

SPECIFICATION forming part of Letters Patent No. 575,669, dated January 19, 1897.

Application filed July 18, 1894. Serial No. 517,937. (No model.) Patented in England January 8, 1894, No. 427; in Transvaal April 2, 1894, No. 617; in France July 5, 1894, No. 239,819; in Germany November 24, 1894, No. 82,722; in Victoria October 29, 1895, No. 12,628; in New South Wales October 31, 1895, No. 6,163; in South Australia October 31, 1895, No. 3,075, and in New Zealand November 5, 1895, No. 8,035.

*To all whom it may concern:*

Be it known that I, GEORGE ROBSON, a subject of the Queen of Great Britain and Ireland, residing at Llanfachreth, Dolgelly, North Wales, United Kingdom of Great Britain and Ireland, have invented an Improvement in the Separation of Metals and Metallic Compounds from Ores or other Substances, (for which I have obtained Letters Patent in England, No. 427, dated January 8, 1894; in France, No. 239,819, dated July 5, 1894; in Germany, No. 82,722, dated November 24, 1894; in Victoria, No. 12,628, dated October 29, 1895; in New South Wales, No. 6,163, dated October 31, 1895; in South Australia, No. 3,075, dated October 31, 1895; in New Zealand, No. 8,035, dated November 5, 1895, and in Transvaal, No. 617, dated April 2, 1894,) of which the following is a specification.

This invention has for its object to separate and recover, in an economical manner, finely-divided metal and metallic compounds, such as sulfids and metallic oxids present in finely-divided substances, such as crushed ores, slimes, and the refuse matter, such as the tailings, float matter, and the like, carried away by the water used in the washing and dressing of metalliferous ores and earths, as in crushing-machines, buddles, jigging-machines, vanning-machines, and the like. For this purpose the substances containing finely-divided metal or metallic compounds such as referred to, or both, (hereinafter referred to as metallic matter,) are brought into intimate contact with an oily liquid that is of less specific gravity than water, and is capable of taking up the said finely-divided metallic matter and thus separating it from the substances with which it was previously mixed.

I have found by experiment that a suitable liquid for the purpose mentioned can be obtained by mixing a liquid hydrocarbon, such, for example, as turpentine, petroleum, paraffin, or the like, with a fatty oil such as colza-oil, the proportion of fatty oil in the mixture varying say, for example, from about ten to twenty-five per cent. of the hydrocarbon, according to the nature of the material to be treated. For example, when treating quartz containing gold and iron oxid for the recovery of the gold a smaller quantity, say ten per cent., of fatty oil should be used than when iron oxid is absent, in order that the iron oxid may not be removed with the gold. I prefer to use as the liquid hydrocarbon a mineral oil such as petroleum or paraffin on account of its cheapness. The fatty oil appears to play the principal part in the actual separation of the metallic matter, the liquid hydrocarbon acting the part of a diluent.

In carrying out my invention the finely-divided substances can, in a soft and plastic state, be brought into contact with the mixture of oils (hereinafter referred to as the oily liquid) in various ways. Thus the said substances in a moist or pasty state, due to admixture therewith of a small quantity of water, say from about twenty-five per cent. to thirty-five per cent. of water, may be mixed or agitated with the oily liquid in a suitable vessel in such a manner that the metallic matter present in the resulting mud or mass will be brought into intimate contact with the oily liquid, so as to be taken up thereby and be then carried to the surface of the mass, whence it can be run off, with a portion of the oily liquid, into a suitable settling vessel or separating device wherein the metallic matter is allowed to subside or is separated and from which the oily liquid is withdrawn for reuse.

In the accompanying drawings, Figure 1 is a vertical section, and Fig. 2 a half-sectional plan showing an arrangement of apparatus suitable for thus carrying out my invention. Fig. 3 is a detail view. Fig. 4 is a part plan of a settling vessel.

The apparatus, Figs. 1, 2, and 3, comprises a vessel 1, provided with a false bottom consisting, preferably, of finely perforated or reticulated sheet material 2, held between two stronger and coarsely-perforated plates 3, the space between this false bottom and the true bottom 1ª of the vessel forming a deliverychamber 4, that is placed by a pipe 5 in communication with a pump 6 for supplying the oily liquid thereto.

5$^a$ is an exit-pipe for running off oily liquid laden with metallic matter into a separating device.

5$^b$ is a pipe normally closed for draining off the oily liquid remaining in the vessel at the termination of the treatment of a charge of material.

Within the vessel are arranged two series of vertical stirring-rods 7 7$^a$, arranged to revolve in concentric circles and carried by horizontal arms 8 8$^a$, extending, respectively, from hubs 9 9$^a$, fixed to or formed in one, with two rotary shafts 10 10$^a$ extending through the bottom of the vessel. The shaft 10 passes through a stuffing-box 11 and is carried by a step-bearing 12, formed by the central portion of a curved bracket 12$^a$, (shown separately in Fig. 3,) the ends of which are secured to the bottom of the vessel. The hub 9 of this shaft may advantageously be provided with a centrally-arranged tubular extension 13, through which the shaft 10$^a$ extends and which is closed at the top by a cover 13$^a$, formed with an annular bearing 13$^b$, of V shape in cross-section, and adapted to receive a correspondingly-shaped annular ridge on the under side of the hub 9$^a$ and so prevent escape of material at this point. The rotary shaft 10$^a$ extends through the shaft 10 and is carried by a second step-bearing 12$^b$, formed and arranged similarly to 12.

To the shafts 10 and 10$^a$ are respectively fixed two bevel-wheels 14 14$^a$, that are in gear with a bevel-wheel 15, that is common to them and which is fixed upon a driving-shaft 16, provided with a driving-wheel 17.

18 is a bevel-wheel in gear with bevel-wheel 14 and fixed upon a shaft 19, having a crank 20, which serves to operate, through a connecting-rod 21, the pump 6, which may be of any suitable kind, such as a single or double acting plunger pump. The bearings 22 of the two shafts 16 and 19 are carried by a plate 23, which is suspended from the bottom of the vessel 1 by bolts 24 and is slotted at 23$^a$ to accommodate the bevel-wheels 15 and 18.

To enable the bottom 1$^a$ to be readily removed for gaining access to the chamber 4, the said bottom may conveniently be secured in place by nuts 24$^b$ on the bolts 24 and the stuffing-box 11 be unprovided with the usual flange at its outer end, so that upon loosening the said nuts and the nuts upon the gland-studs the bottom can be lowered to an extent limited by the stuffing-box gland 11$^a$. The vessel is provided with trunnions 25, mounted in bearings 26, fixed upon two beams 27, so that it can be partly rotated, when necessary, to discharge its contents, at which time the driving-belt is removed from the driving pulley 17.

28 28$^a$ are two brackets fixed to the vessel and adapted to bear against the upper and lower sides, respectively, of one of the beams 27, to which they are fixed by bolts to hold the vessel steady when the stirring mechanism is in operation.

The exit-pipe 5$^a$ is arranged to deliver the oily liquid escaping from the top of the vessel into a separator having its outlet in connection with the suction of the pump 6, the arrangement being such that oily liquid can be caused to flow continuously through the finely divided and agitated substances in the vessel 1 and then be delivered with metallic matter taken up thereby into the separator, wherein such matter is separated from the oily liquid, which is drawn off by the pump for reuse.

In carrying out the invention the cover 13$^a$ of the vessel 13 is removed, the finely-divided metalliferous substances in the form of a soft plastic mass, produced by previous admixture of water therewith, as set forth, is placed in the vessel, the cover replaced, the stirring-rods 7 7$^a$ set in motion, and oily liquid circulated continuously through the vessel and separator. By the agitation of the plastic mass with the oily liquid the finely-divided metallic matter present therein is brought into intimate contact with the oily liquid, which takes it up and carries it off from the gangue or earthy matter present, which, owing to its admixture with water, forms a soft plastic mass that is of greater specific gravity than the oily mixture and which is not disintegrated by and consequently disseminated through and carried off by the oily liquid. In this way the finely-divided metallic matter is separated from the gangue and floated or carried off by the oily liquid into the separator, where it is allowed to deposit by gravity, the gangue remaining in the form of a soft plastic mass at the bottom of the mixing vessel.

The separating device may conveniently consist of a settler of ordinary construction, consisting of a vessel 29, Fig. 4, provided with divisions or baffles 30, so as to form a zigzag course for the oily liquid, and in which the metallic matter is allowed to separate from the oily liquid by gravity, the oily liquid running off clear for reuse.

I am aware that it has been proposed to recover finely-comminuted metal from ores by the use of oils mixed with acids or salts by mixing the finely-divided ores with oils and acids or salts and afterward washing out the gangue with water, and also of mixing the ores with oils and then washing out the sand or gangue with water containing acid. I disclaim the use of acids or salts and also the method of washing away the gangue with water, both these methods being entirely dissimilar to the method herein described as constituting my invention, according to which I effect the separation of the metallic matter by the mixture of oils alone, using such mixture to wash out the metallic matter and avoiding as far as possible the presence of water much in excess of the quantity hereinbefore mentioned, as I find an excess of water prevents the successful carrying out of my invention.

It has been found that the oily mixture has an affinity or cohesion with the metallic particles greatly exceeding that for the non-metallic particles, so that when motion is imparted to the oil the traction of the oil, due to the aforesaid cohesion, is sufficient to overcome the gravital tendency of the metallic particles, while its cohesion for the non-metallic particles is insufficient to overcome the gravital tendency of said non-metallic particles. It follows that when such motion has been imparted to the oil the traction on the metallic particles is sufficient to carry such particles up while the non-metallic particles remain behind, a separation of the two being thus effected, the metallic particles being afterward separated from the oily mixture.

What I claim is—

1. The herein-described mode of separating and recovering finely-divided metal and metallic compounds from finely-divided substances, which consists in intimately and thoroughly mixing said substances with a diluent liquid containing a fatty substance so that the metallic portions are taken up by the fatty substance then removing the oily liquid with metallic matter from the said finely-divided substances and then separating the metallic matter from said oily liquid, substantially as herein described.

2. The method of recovering metals and metallic compounds from finely-divided substances, which consists in thoroughly and mechanically agitating and mixing a fatty oil with said substances while the same are in a moist or plastic state due to admixture of water therewith, then drawing off the fatty oil carry the metal particles, and metallic compounds from said substances, and then separating the metals and metallic compounds from the oil, substantially as described.

3. The herein-described mode of recovering metals and metallic compounds from finely-divided substances in a moist state, which consists in passing oil through the mass of finely-divided material so that the oil floats off the metallic portions against the force of gravity, and removing the oil carrying said metallic particles and separating the metallic portions therefrom, substantially as described.

4. The herein-described method of separating and recovering finely-divided metal and metallic compounds from finely-divided substances which consists in forming said finely-divided substances into a moist or pasty mass by admixture therewith of water, floating off finely-divided metallic compounds from said mass by agitating the same with an oily liquid, drawing off the oily liquid, and separating therefrom the metallic matter carried off thereby, substantially as described.

5. The herein-described method of washing out metals and metallic compounds from finely-divided substances, which consists in causing an oily liquid to flow in a practically continuous stream through the said substances while the same are in a stirred or agitated state, separating the metallic matter from the oily liquid by gravity after it has been removed from the said substances, and afterward again bringing the oily liquid into contact with the said substances for reuse, substantially as herein described.

6. The combination of the horizontal supporting-beams, the closed separating vessel having the inlet and outlet pipes and the driving-gear at its lower end, said vessel having the lateral trunnions journaled in said beams and the lateral arms 28 and 28$^a$ above and below the planes of the beams as and for the purposes described.

7. The combination of the outer casing, the vertical shaft passing therethrough and at one end of the casing, having the disk provided with stirring-arms extending longitudinally of the casing, a sleeve on said shaft and turning oppositely thereto, a disk in the casing on the sleeve having the stirring-arms extending longitudinally of the shaft and between the first-mentioned stirrer-arms, brackets at the lower end of the casing having bearings for the lower ends of the sleeve and shaft, and gears on the sleeve and shaft provided with means for driving them in opposite directions, substantially as described.

8. For separating and recovering metallic matter from finely-divided substances containing the same, apparatus comprising a pivoted vessel having a perforated or reticulated false bottom and inlet and outlet passages for oily liquid, stirrers arranged within said vessel, a pump carried by said vessel and adapted to cause oily liquid to flow therethrough and mechanism carried by said vessel for driving said stirrers and pumps substantially as herein described.

9. In a separator, the combination of the cylindrical casing, the central longitudinal shaft therein, the disk on the shaft at one end of the casing having the stirrers, the sleeve turnable on the shaft, the disk on said sleeve in the opposite end of the casing having the stirrers extending between and parallel with the opposite stirrers, the central closed longitudinal cylinder 15, between and engaging said disks, and gearing rotating the sleeve and shaft in opposite directions, substantially as described.

In testimony whereof I have signed my name to this specification in the presence of two subscribing witnesses.

GEORGE ROBSON.

Witnesses:
PERCY ERNA HOCKS,
EDMUND S. SNEWIN.